(12) United States Patent
Persyk et al.

(10) Patent No.: US 7,397,038 B2
(45) Date of Patent: Jul. 8, 2008

(54) NUCLEAR IMAGING USING THREE-DIMENSIONAL GAMMA PARTICLE INTERACTION DETECTION

(75) Inventors: Dennis E. Persyk, Hampshire, IL (US); John C. Engdahl, Lake Forest, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 977 days.

(21) Appl. No.: 10/873,113

(22) Filed: Jun. 23, 2004

(65) Prior Publication Data
US 2005/0023474 A1     Feb. 3, 2005

Related U.S. Application Data

(63) Continuation of application No. 09/335,183, filed on Jun. 17, 1999, now abandoned.

(51) Int. Cl.
*G01T 1/24* (2006.01)
(52) U.S. Cl. ............................. 250/370.1; 250/370.09; 250/363.03

(58) Field of Classification Search .............. 250/370.1, 250/370.09, 363.03
See application file for complete search history.

(56) References Cited

U.S. PATENT DOCUMENTS

| | | | |
|---|---|---|---|
| 4,857,737 A * | 8/1989 | Kamae et al. | 250/370.09 |
| 6,169,287 B1 * | 1/2001 | Warburton | 250/370.1 |

* cited by examiner

*Primary Examiner*—David P. Porta
*Assistant Examiner*—Shun Lee

(57) ABSTRACT

An improved method of, and apparatus for, nuclear imaging takes advantage of the ability to determine the depth of gamma ray/electron interaction within a semiconducting gamma ray detector to determine the (most highly probable) location of the first gamma ray/electron interaction within the detector. Lines of interaction constructed between opposing detector arrays, extending between the location of the first gamma ray/electron interaction in each detector associated with the coincident detection of gamma radiation, permits a positron-emitting object of interest to be imaged according to protocols known in the art, but with better spatial resolution than previously believed to have been known.

6 Claims, 5 Drawing Sheets

NUCLEAR IMAGING USING THREE-DIMENSIONAL GAMMA PARTICLE INTERACTION DETECTION

CROSS-REFERENCE TO RELATED APPLICATION

This application is a continuation under 35 U.S.C. § 120 of application Ser. No. 09/335,183 filed Jun. 17, 1999, which is now abandoned.

FIELD OF THE INVENTION

The present invention relates generally to nuclear imaging, e.g., of the sort used in nuclear medicine. More particularly, the invention relates to an improved method of, and apparatus for, imaging using coincident detection of gamma ray interactions, with two different spaced detectors, as typically used in positron emission tomography (PET) scanning.

BACKGROUND OF THE INVENTION

In general, nuclear imaging that is based on detecting gamma rays is well known. In a Compton scatter camera, for example, basic operating principles of which are illustrated schematically in FIG. 1, a source object of interest 10, e.g., a particular organ within the human body, is caused to be impregnated with a radioisotope which emits gamma radiation. A gamma photon travels along a first path of travel 12 until it interacts with an electron of an atom within the detector at location A within a first detector 14. The gamma photon is then deflected or scattered by a Compton scatter angle θ and travels along a second path of travel 16 until it interacts with another electron at location B within a second detector 18.

The scatter angle Θ can be calculated from the amount of energy deposited in each of the detectors 14 and 18 at locations A and B, respectively, from the relation $$E_{sc} = \frac{E_{in}}{1 + \frac{E_{in}(1 - \cos\Theta)}{511 \text{ keV}}},$$

where $E_{sc}$ is the energy of the scattered photon and $E_{in}$ is the energy of the incident photon. Thus, $$\cos\Theta = 1 - \frac{511 \text{ keV}\left(\frac{E_{in}}{E_{sc}} - 1\right)}{E_{in}}.$$

The actual direction from which the incident gamma ray has come, however, cannot be determined. Therefore, for each detected gamma ray/electron interaction event (consisting of all individual gamma ray/electron interactions associated with a given incident gamma ray), a conic arc 20 exists in the image plane representing the intersection of all possible lines of travel of the incident gamma ray and the image plane that could correspond to the calculated Compton scatter angle.

A more detailed discussion of the basic operating principles of a Compton scatter camera and the disclosure of an improved Compton scatter camera can be found in U.S. Pat. No. 5,175,434, the disclosure of which is incorporated by reference.

In positron emission tomography (PET) imaging, basic operating principles of which are illustrated schematically in FIG. 2, a positron 22 is emitted by the source object 10, which has been caused to be impregnated with a positron-emitting radioisotope. Within a few millimeters from the point of emission, the positron 22 combines with an electron 24 and a pair of gamma rays 26 are emitted as the positron is annihilated. The two gamma rays travel in diametrically opposed directions, which are independent of the original direction of travel of the positron, and strike opposing scintillating crystal detectors 28, 30 through which the gamma rays scatter. Because the gamma rays travel at the speed of light, which is extremely large in relation to the distance between the detectors 28 and 30, the gamma photons strike the detectors 28 and 30 at, for all intents and purposes, exactly the same time.

As the gamma rays scatter throughout the detectors, visible light is emitted from each particular crystal pixel (see FIG. 2A) in which a gamma ray/electron interaction occurs. This visible light is transmitted through glass light pipes 32, 34 to a series of photomultiplier tubes 36, which are used to decode the x- and y-locations of the gamma ray/electron interactions within each of the detectors 28 and 30, i.e., in which individual crystal within the array of crystals comprising the detector the gamma ray/electron interactions occurred.

Because an atom which is struck by a gamma ray will not emit light immediately upon being struck by the gamma ray, and because the gamma rays scatter throughout the detectors at the speed of light such that all scintillating pixels will scintillate at essentially the same time, it is impossible to determine the pixel in each detector in which the first gamma ray/electron interaction occurred. Accordingly, the location at which each gamma ray initially strikes each detector is assumed to be at the centroid of the scintillating pixels.

The point at which the positron was annihilated and the two gamma rays were generated is then assumed to be located along a "line of interaction" extending between the location in each of the two detectors at which the initial gamma ray/electron interaction is assumed to have occurred, and an image of the source object is generated from a multitude (i.e., on the order of millions to tens of millions) of such lines of interaction, as is known in the art. The line of interaction generated for each set of coincident gamma ray/electron interaction events has a certain amount of inherent uncertainty or error associated with it, however, due to the "averaging" associated with assuming that the location of initial gamma ray/electron interaction is at the centroid of the scintillating pixels.

SUMMARY OF THE INVENTION

The present invention significantly reduces the uncertainty associated with each line of interaction generated in PET-type, coincident interaction-based imaging and therefore increases the resolution of the composite image that is generated. The invention accomplishes this by taking advantage of the ability to determine the depth of each individual gamma ray/electron interaction within a semiconductor detector, which in turn allows one to determine the position of the interaction within three-dimensional space.

As a gamma ray scatters throughout an array of semiconductor "pixels," the energy deposited in the semiconductors at each site of interaction (and there most likely will be two or three such sites of interaction associated with each incident gamma ray) is measured, from which various possible Compton scatter angles for each "set" of interactions can be determined. However, because all gamma ray/electron interactions within each array of semiconductors occur essentially simultaneously (due to the fact that the scattering occurs at the speed of light), it is not possible from this information alone to determine the actual sequence of interactions and hence the location of the first gamma interaction (which is more indicative of the true direction from which the gamma ray originally came than the average, centroid of interaction events). Depth-of-interaction information locates the position of each interaction in three-dimensional space, however, and permits the (most probable) location of first interaction within each detector array to be determined. The lines of interaction from which the image is constructed can then be generated with greater certainty, i.e. with less error, to produce an image with better resolution.

BRIEF DESCRIPTION OF THE DRAWINGS

The invention will now be described in greater detail in connection with the drawings, in which.

DETAILED DESCRIPTION OF THE PREFERRED EMBODIMENTS

Figure 1:
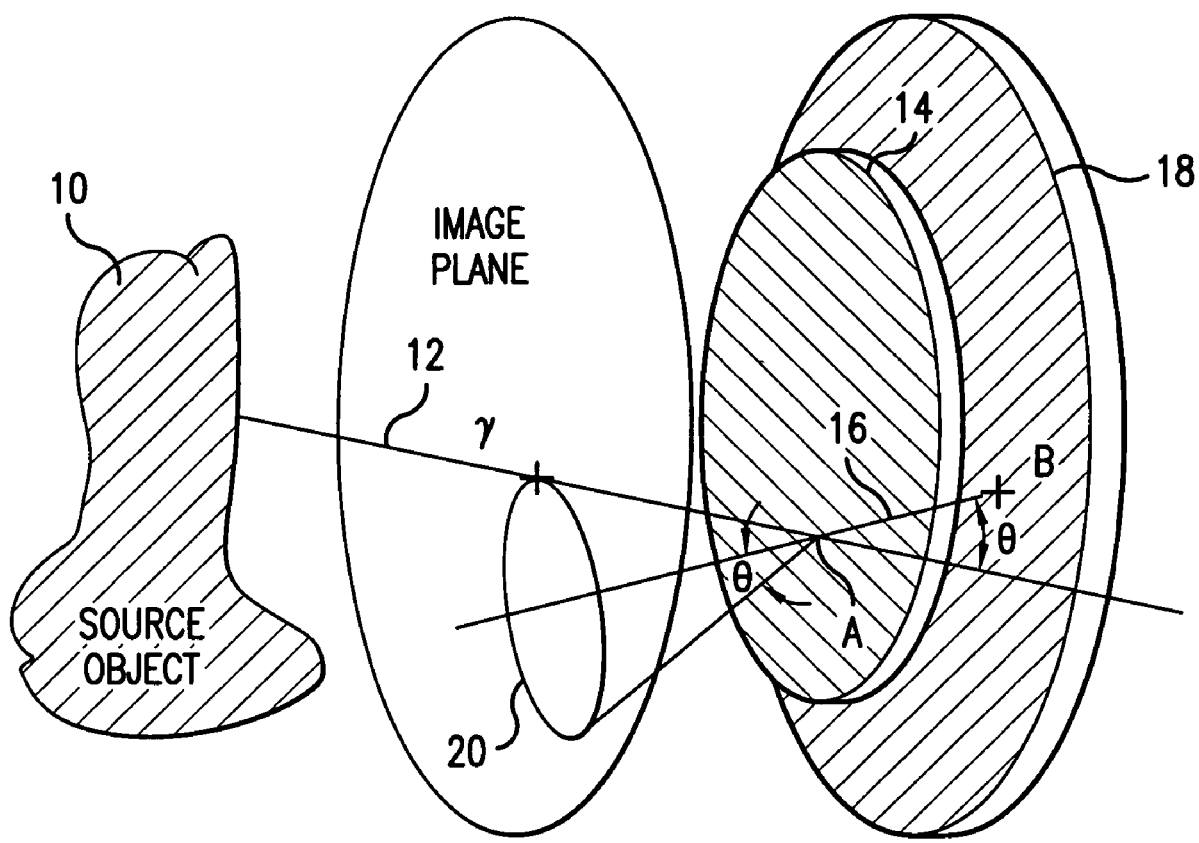
FIG. 1 is a schematic, perspective view illustrating basic operating principles of a Compton scatter camera.
Figure 2:
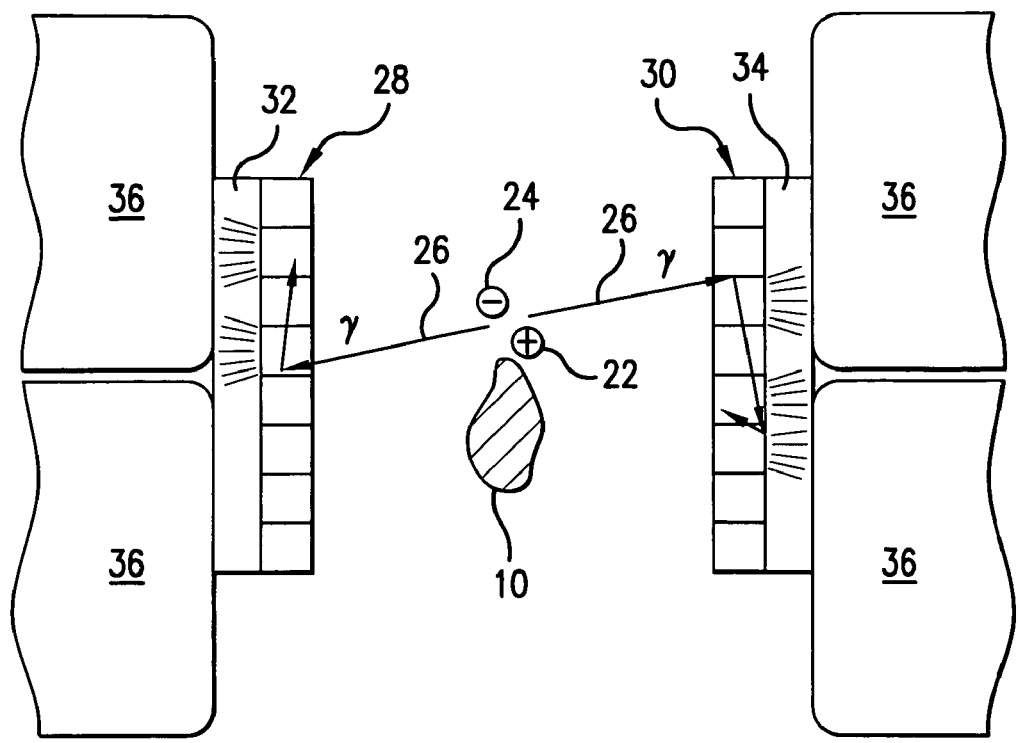
FIG. 2 is a schematic, side elevation view illustrating basic operating principles of a positron emission tomography (PET), coincident gamma interaction-based imaging system.
Figure 2A:
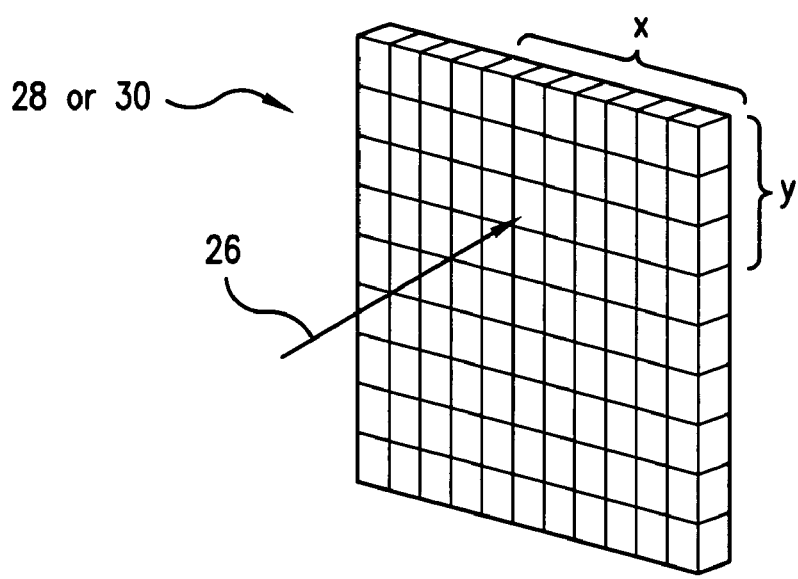
FIG. 2A is a schematic, perspective view of one of the detectors used therein.

The imaging method and apparatus of the invention utilize a pair of opposing, semiconductor-based gamma interaction detectors that are arranged somewhat similarly to the prior art, scintillation-based detectors shown in FIG. 2. Each detector 100 (FIG. 3) is constructed as an array of individual semiconducting elements or "pixels" 102, which preferably are cadmium zinc telluride, CdZnTe, and each detector has on the order of ten by ten such pixels. Each element or pixel 102, which is on the order of one millimeter by one millimeter in height and width and on the order of one centimeter in length, has an electrode at each end thereof. Preferably, the detector is constructed with individual coplanar grid anodes 104 (and their associated leads 106) bonded to the individual ends of the detecting elements forming one surface of the detector 100 and a single continuous cathode 108 bonded across all the opposite ends of the semiconductor detecting elements 102 in a gamma interaction-detecting arrangement as is known in the art.

Figure 3:
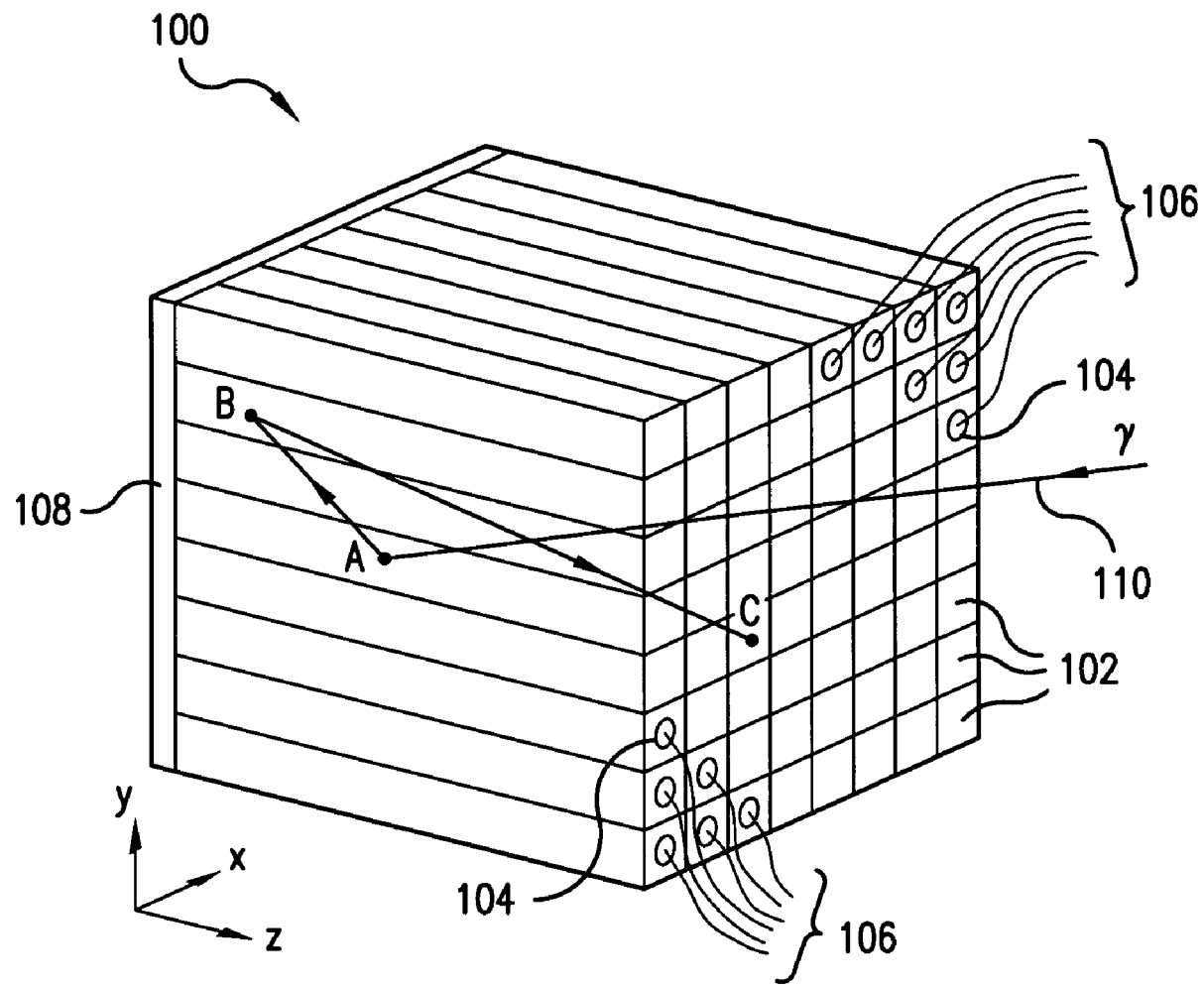
FIG. 3 is a schematic, perspective view of a three-dimensional, pixilated detector used in coincident gamma interaction-based imaging according to the invention.

In terms of gamma ray/electron interaction-detecting operation of the detector 100, it does not matter whether the gamma rays 110 enter the detector through the surface having the anodes or the surface having the cathode. For purposes of constructing an actual instrument used, e.g., for PET imaging of a patient, however, it is preferable to have the detector arranged with the continuous cathode closest to the patient and the anodes, with all of their leads having to be connected to the operating circuitry, located further away from the patient and more towards the interior of the machine, as indicated schematically in FIG. 4. Accordingly, the arrangement in FIG. 3 is opposite to the arrangement one would expect actually to employ in practice in that the gamma ray—assumed to be emanating from the vicinity of the patient—is entering the detector through the anode side. This depiction is intended primarily for clarity of showing the anodes.

Figure 4:
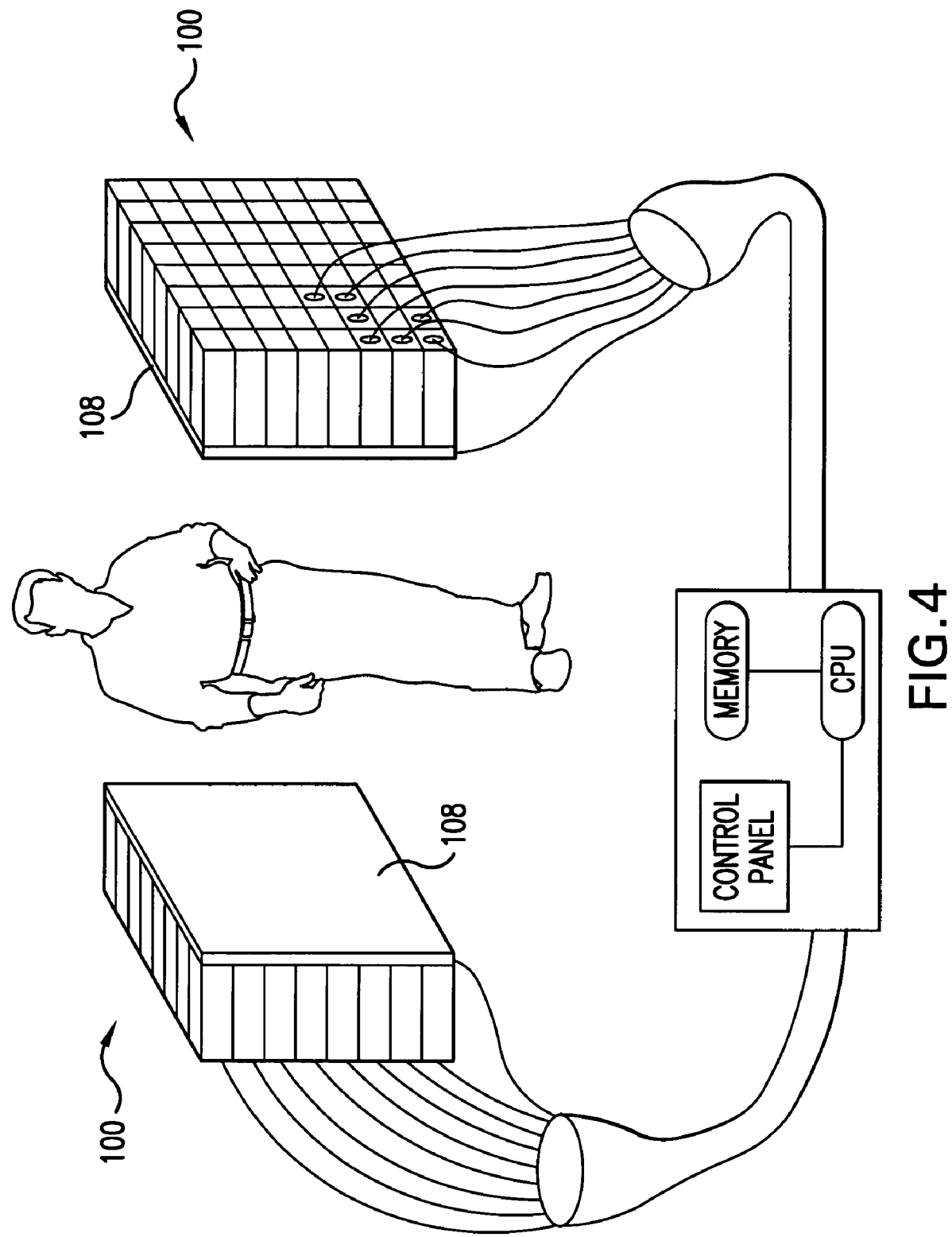
FIG. 4 is a schematic, perspective view illustrating the use, in a PET detector apparatus, of two of the three-dimensional, pixilated detectors shown in FIG. 3.

(It should also be noted that, for simplicity, just two detectors 100 are shown in FIG. 4. In actuality, several hundred to several thousand such detectors 100 would be assembled together to form opposing gamma ray-detecting panels of detectors.)

With this detector arrangement, the energy deposited in an individual semiconducting pixel element 102 as a gamma ray interacts with an electron therein can be measured in a manner that is known in the art. Additionally, the depthwise (z-direction, as shown in FIG. 3) location at which the gamma ray interacts with an electron in the pixel can be determined by detecting the beginning of electron charge pulses gathered at the anodes 104 and the beginning of charge pulses attributable to the migration of holes at the cathode 108, and calculating the depthwise location of the interaction from the amount of time which elapses between the time the charge pulses are sensed in the relevant anode and in the cathode; the length of the elements 102; and the speed at which the electrons and the electron holes move through the semiconductor elements 102. This method of determining the depth of gamma ray interaction is also known in the art. (For purposes of practicing the invention, the x- and y-location of a particular gamma ray/electron interaction may be assumed to be in the x-y center of the particular element or pixel 102 in which the interaction occurs.)

Once the position in three-dimensional space of each gamma ray/electron interaction is determined, in each of the opposing gamma ray detectors, for a given interaction event, the location of the first gamma ray/electron interaction can be determined as follows. For each of the detectors, one of the interaction locations is chosen randomly and is assumed to be the location of the first gamma ray/electron interaction; any one of the other locations within the detector is then chosen randomly and assumed to be the location of the next gamma ray/electron interaction. Using the Compton scatter equations (set forth above), the amount of energy deposited at each of the two assumed locations is used to calculate a hypothetical, calculated scatter angle corresponding to gamma ray/electron interactions occurring according to the assumed sequence.

This hypothetical, calculated angle is then compared to the angle that be the scatter angle if the gamma ray actually scattered according to the assumed sequence of interactions. It will be appreciated that the assumed, "actual" angle can be determined from the position in space of each interaction in the assumed sequence, and that the assumed location of origination of the gamma ray will have to lie somewhere along a line extending between the location of the assumed first interaction and the opposing detector (because of the nature of the positron annihilation and gamma ray generation). If the hypothetical scatter angle calculated from the Compton scatter equations is significantly different from the assumed, "actual" scatter angle necessarily associated with the presumed sequence of interactions such that the presumed sequence could not be valid, the sequence is eliminated as a possibility and one of the remaining interaction locations is chosen randomly as the location of the second gamma ray/electron interaction. The process of a) calculating a hypothetical scatter angle from the energy deposited at each of the two assumed interaction locations, in the assumed order; and b) comparing that hypothetical angle against the actual scatter angle which would exist if the assumed sequence were correct to determine the validity of the assumed sequence is then repeated. (It is unlikely that there would be more than three or four interaction locations which must be considered in this manner, so the number of possible sequences to be so considered is relatively manageable.)

Once (if) all possible gamma ray/electron interaction sequences are eliminated for a given assumed initial interaction location, one of the other interaction locations is assumed to be the location of first gamma ray/electron interaction and the process is repeated as necessary until only one valid interaction sequence remains. A line of interaction extending between the location of the first gamma ray/electron interaction in each of the two opposing detectors is then constructed for the coincident interaction event. This process is repeated a multitude of times (i.e., for all coincident interaction events) to construct a multitude of lines of interaction from which an image is constructed according to PET imaging protocols which will be known to those having skill in the art.

Other approaches or algorithms for deducing the location of the first gamma ray/electron interaction in each of the opposing detectors, for each of the coincident interaction events, will occur to those having skill in the art. For example, because the number of interaction locations within each detector for each interaction event is expected to be on the order of no more than three or four, the number of possible sequences, which is simply the number of different permutations of the interactions, will be relatively manageable. Thus, all possible sequences can be determined or "mapped out" a priori, with the hypothetical, Compton equation-based scatter angles for each possible sequence being compared to the actual scatter angles that each hypothetical sequence necessarily would have to have associated therewith. Invalid sequences then would be thrown out when any of the calculated or hypothetical scatter angles for a given assumed sequence does not comport with the "actual" scatter angle that would have to have existed such that the assumed sequence could not be valid.

Figure 5:
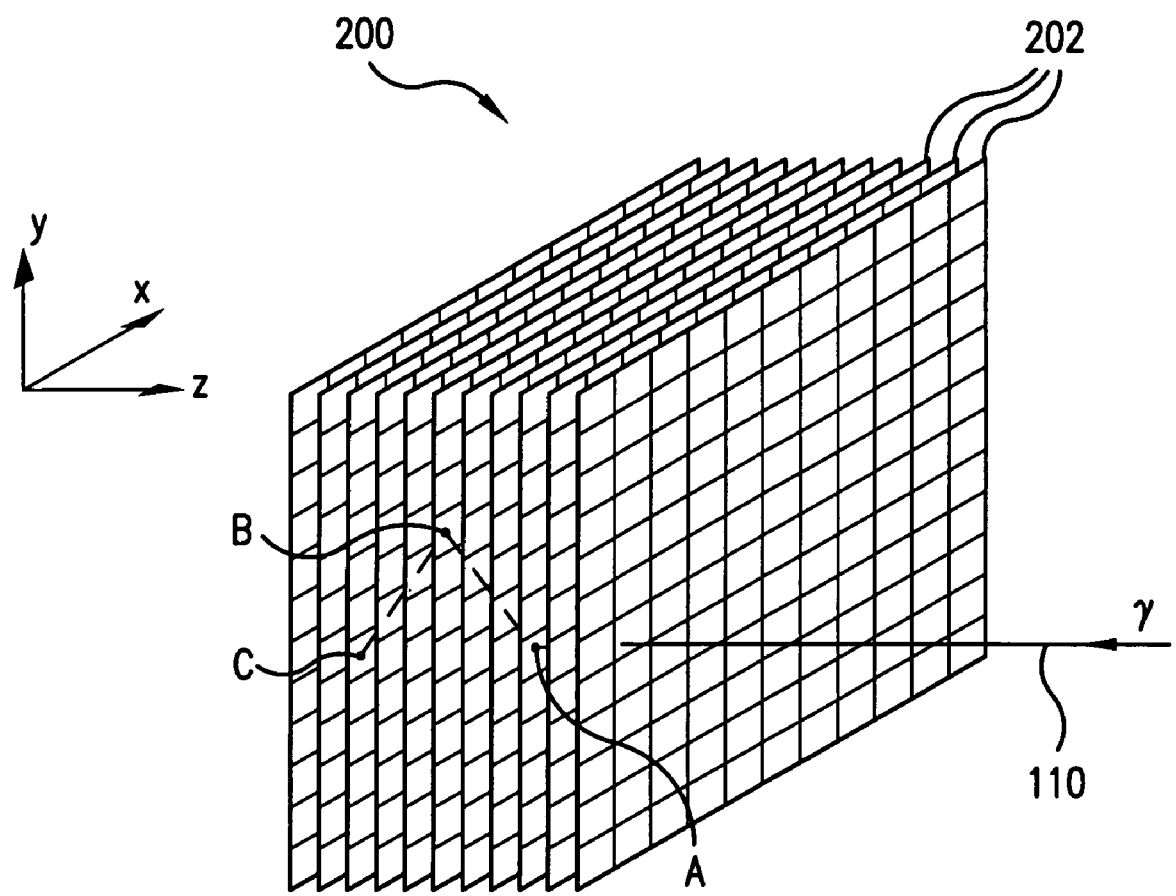
FIG. 5 is a schematic, perspective view of an alternative embodiment of a three-dimensional, pixilated detector used in coincident gamma interaction-based imaging according to the invention.

With respect to the apparatus, the gamma ray detectors depicted and described above are "unitary" in that they consist of crystal elements assembled into a solid array capable of locating the interactions in three dimensions. As an alternative, a series of essentially planar, two-dimensional detectors 202 (FIG. 5), which each can only locate gamma ray/electron interactions in two dimensions, can be stacked up so as to provide three-dimensional information based on the position within the stack of the planar detectors in which each interaction is detected. Such a stacked detector configuration 200 is illustrated schematically in FIG. 5.

Finally, given the speed with which the gamma ray/electron interaction events occur, the "higher level" mathematics used in constructing an image from the multitude of lines of interaction, and the impracticality of executing the algorithm to deduce or isolate the location of each first interaction "with pencil and paper," it is apparent that appropriate computing facilities necessarily will be employed to process the signals received from the detectors, as has been done in the past with previously known PET detectors. See FIG. 4, for example.

Other modifications will occur to those having skill in the art and are deemed to be within the scope and spirit of the following claims.

We claim:

1. A method of positron emission tomographic nuclear medical imaging, comprising the steps of:
   detecting a plurality of gamma interactions in a first gamma ray detector, wherein said plurality of gamma interactions corresponds to a single coincidence event;
   for each of said plurality of detected gamma interactions, determining the depth of interaction in said gamma ray detector and the amount of energy deposited in said gamma ray detector;
   determining which one of said plurality of detected gamma interactions in said gamma ray detector occurred first, by
   1) selecting an arbitrary one of said plurality of detected gamma interactions as a tentative first interaction;
   2) selecting a remaining one of said plurality of detected gamma interactions as a tentative second interaction;
   3) calculating a hypothetical Compton scatter angle between said tentative first and second interactions based on the determined amount of energy deposited thereby in said gamma ray detector;
   4) comparing said hypothetical Compton scatter angle with an actual Compton scatter angle as obtained from said determined depth of interaction of said tentative first and second interactions;
   5) determining whether said tentative first and second interactions are actual first and second interactions based on the result of said comparison;
   6) if the determination of step 5) is negative and additional remaining detected gamma interactions exist, repeating steps 2) through 5) for a different remaining one of said plurality of detected gamma interactions;
   7) if the determination of step 5) is negative and no additional remaining detected gamma interactions exist, repeating steps 1) through 6) for a different arbitrary one of said plurality of detected gamma interactions; and
   generating a line of interaction between a determined actual first interaction in said first gamma ray detector and a similarly determined actual first interaction in a second gamma ray detector, to thereby determine the location of said coincidence event.

2. The method of claim 1, wherein said gamma ray detectors comprise arrays of individual, three-dimensional semiconductor elements, and wherein the step of determining the depth of interaction comprises identifying the semiconductor element in which a gamma interaction occurs and calculating the distances from said interaction to respective electrode surfaces of the respective semiconductor element in which the interaction has occurred.

3. The method of claim 2, wherein said distances are calculated based on the amount of time between the time at which charge pulses attributable to the flow of electrons are first detected at an anode on one of said electrode surfaces and the time at which charge pulses attributable to the flow of holes are first detected at a cathode on the other of said electrode surfaces.

4. Apparatus for positron emission tomographic nuclear medical imaging, comprising:
   a pair of three-dimensional gamma ray detectors that detect a coincident gamma event as a plurality of gamma interactions in each detector, each of said detectors being capable of determining the depth of interaction and the amount of energy deposited by a gamma interaction therein; and
   a data processor capable of determining, for each coincident gamma event, which one of said plurality of detected gamma interactions in each of said gamma ray detectors occurred first, by performing the following functions:
   1) selecting an arbitrary one of said plurality of detected gamma interactions as a tentative first interaction;
   2) selecting a remaining one of said plurality of detected gamma interactions as a tentative second interaction;

3) calculating a hypothetical Compton scatter angle between said tentative first and second interactions based on the determined amount of energy deposited thereby in said gamma ray detector;
4) comparing said hypothetical Compton scatter angle with an actual Compton scatter angle as obtained from said determined depth of interaction of said tentative first and second interactions;
5) determining whether said tentative first and second interactions are actual first and second interactions based on the result of said comparison;
6) if the determination of step 5) is negative and additional remaining detected gamma interactions exist, repeating steps 2) through 5) for a different remaining one of said plurality of detected gamma interactions;
7) if the determination of step 5) is negative and no additional remaining detected gamma interactions exist, repeating steps 1) through 6) for a different arbitrary one of said plurality of detected gamma interactions; and generating a line of interaction between a determined actual first interaction in one of said pair of gamma ray detectors with a determined actual first interaction in the other of said pair of gamma ray detectors, to thereby determine the location of said coincidence event.

5. The apparatus of claim 4, wherein each of said gamma ray detectors comprise arrays of individual, three-dimensional semiconductor elements extending in first and second orthogonal directions, and the location of a gamma interaction in a third direction orthogonal to each of said first and second directions is determined.

6. A method of positron emission tomographic nuclear medical imaging, comprising the steps of:

detecting a plurality of gamma interactions in a first gamma ray detector, wherein said plurality of gamma interactions corresponds to a single coincidence event;

for each of said plurality of detected gamma interactions, determining the depth of interaction in said gamma ray detector and the amount of energy deposited in said gamma ray detector;

determining which one of said plurality of detected gamma interactions in said gamma ray detector occurred first, by performing an iterative process of comparing hypothetical Compton scatter angles between arbitrarily chosen first and second gamma interactions obtained from deposited energy values, with actual Compton scatter angles obtained from determined depths of interaction, until an actual first occurring gamma interaction has been identified; and generating a line of interaction between a determined actual first interaction in said first gamma ray detector and a similarly determined actual first interaction in a second gamma ray detector, to thereby determine the location of said coincidence event.

* * * * *